US009836084B2

(12) United States Patent  
Chau et al.

(10) Patent No.: US 9,836,084 B2  
(45) Date of Patent: Dec. 5, 2017

(54) INFERRED UNDOCKING FOR HYBRID TABLET COMPUTER

(71) Applicant: Intel Corporation, Santa Clara, CA (US)

(72) Inventors: Han Chau, Portland, OR (US); Nithyananda S. Jeganathan, Hillsboro, OR (US); Bryan Y. Roe, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 14/229,793

(22) Filed: Mar. 28, 2014

(65) Prior Publication Data

US 2015/0277492 A1    Oct. 1, 2015

(51) Int. Cl.  
*G06F 1/16* (2006.01)  
*G06F 3/0488* (2013.01)

(52) U.S. Cl.  
CPC .......... *G06F 1/1632* (2013.01); *G06F 1/1626* (2013.01); *G06F 1/1643* (2013.01); *G06F 1/1654* (2013.01); *G06F 3/0488* (2013.01)

(58) Field of Classification Search  
CPC ............................ G06F 1/1632; G06F 3/0488  
USPC .......................... 361/679.17, 679.29, 679.41  
See application file for complete search history.

(56) References Cited

U.S. PATENT DOCUMENTS

| | | | | |
|---|---|---|---|---|
| 5,347,425 A | * | 9/1994 | Herron .................. | G06F 1/1632 361/679.41 |
| 5,948,074 A | * | 9/1999 | Ninomiya ............. | G06F 1/1632 361/679.41 |
| RE36,381 E | * | 11/1999 | Boyle ................... | G06F 1/1632 361/679.41 |
| 6,044,473 A | * | 3/2000 | Kim ...................... | G06F 1/1616 361/679.09 |
| 7,345,677 B2 | * | 3/2008 | Ing ........................ | G06F 3/0433 345/173 |
| 8,181,192 B2 | * | 5/2012 | Ezawa ................. | G11B 17/046 720/646 |
| 8,275,413 B1 | * | 9/2012 | Fraden ............. | H04M 1/72522 455/344 |
| 8,792,233 B2 | * | 7/2014 | Terlizzi ................ | G06F 1/1632 361/679.01 |
| 8,938,273 B2 | * | 1/2015 | Kulas ..................... | G06F 3/041 345/173 |
| 9,152,196 B2 | * | 10/2015 | Collopy ................ | G06F 1/1624 |
| 2002/0188792 A1 | * | 12/2002 | Stryker ................. | G06F 1/1616 710/305 |

(Continued)

*Primary Examiner* — Adrian S Wilson  
(74) *Attorney, Agent, or Firm* — Patent Capital Group

(57) ABSTRACT

In an example, there is disclosed a hybrid tablet computing device comprising a tablet member configured to dock to a base member. The base member may include peripherals and other elements to augment the functionality of the tablet member. While docked, the base and tablet may operate in a cooperative mode, while undocking the tablet from the base places the tablet in an independent mode. A user's intent to undock may be inferred by natural interactions, including for example a user gripping the tablet along its top edge while simultaneously placing a hand over a trackpad on the base. If an undocking intent is inferred but the user does not complete the docking process within a timeout period, the tablet may redock and enter the cooperative mode.

24 Claims, 8 Drawing Sheets

(56) References Cited

U.S. PATENT DOCUMENTS

| | | | | |
|---|---|---|---|---|
| 2003/0202323 A1* | 10/2003 | Maeda | G06F 1/1632 | 361/679.41 |
| 2003/0223185 A1* | 12/2003 | Doczy | G06F 1/1626 | 361/679.11 |
| 2005/0152111 A1* | 7/2005 | Skurdal | G06F 1/3215 | 361/679.41 |
| 2006/0038833 A1* | 2/2006 | Mallinson | A63F 13/02 | 345/633 |
| 2007/0133160 A1* | 6/2007 | Ma | G06F 1/1616 | 361/679.17 |
| 2008/0002355 A1* | 1/2008 | Carnevali | G06F 1/1632 | 361/679.41 |
| 2008/0006762 A1* | 1/2008 | Fadell | G01J 1/4204 | 250/201.1 |
| 2008/0238725 A1* | 10/2008 | Gitzinger | G06F 3/0202 | 341/22 |
| 2008/0278450 A1* | 11/2008 | Lashina | G06F 3/0488 | 345/173 |
| 2009/0008234 A1* | 1/2009 | Tolbert | H01H 13/702 | 200/600 |
| 2009/0284465 A1* | 11/2009 | Oki | G06F 3/044 | 345/156 |
| 2010/0265652 A1* | 10/2010 | Agata | G06F 1/1632 | 361/679.41 |
| 2011/0037734 A1* | 2/2011 | Pance | G06F 3/016 | 345/177 |
| 2011/0038114 A1* | 2/2011 | Pance | G06F 1/1616 | 361/679.4 |
| 2011/0043227 A1* | 2/2011 | Pance | G06F 1/1616 | 324/681 |
| 2011/0107958 A1* | 5/2011 | Pance | G06F 3/016 | 116/205 |
| 2011/0164047 A1* | 7/2011 | Pance | G06F 1/1647 | 345/581 |
| 2011/0167078 A1* | 7/2011 | Benjamin | G06Q 10/109 | 707/769 |
| 2011/0193788 A1* | 8/2011 | King | G06F 3/017 | 345/173 |
| 2011/0312349 A1* | 12/2011 | Forutanpour | G06F 1/1626 | 455/466 |
| 2012/0023597 A1* | 1/2012 | Bilbrey | H01R 13/6205 | 726/30 |
| 2012/0280917 A1* | 11/2012 | Toksvig | G06F 1/1626 | 345/173 |
| 2013/0016468 A1* | 1/2013 | Oh | G06F 1/1632 | 361/679.12 |
| 2013/0100605 A1* | 4/2013 | Horii | G06F 1/1626 | 361/679.41 |
| 2014/0118930 A1* | 5/2014 | Sedon | E05B 73/0082 | 361/679.56 |
| 2014/0282051 A1* | 9/2014 | Cruz-Hernandez | G06F 3/0414 | 715/744 |
| 2015/0234771 A1* | 8/2015 | Wu | G06F 1/1632 | 710/303 |

* cited by examiner

US 9,836,084 B2

INFERRED UNDOCKING FOR HYBRID TABLET COMPUTER

FIELD OF THE DISCLOSURE

This application relates to the field of mobile computing, and more particularly to a system and method for inferred undocking of a hybrid tablet computer.

BACKGROUND

Hybrid tablet computers provide a combination of benefits from both tablet computers and more traditional laptop computers. Tablet computers provide intuitive touch interfaces, light weight, and an ultra-portable form factor. They are limited, however, in their ability to produce content rather than consume content, particularly in that they often lack true "QWERTY" keyboards and may have limited processing power and storage space. In contrast, traditional laptop computers often have full "QWERTY" keyboards, trackpads, relatively larger screens, and in some cases docking connectors for interfacing with a full desktop setup such as one or more large displays, speakers, wired or wireless keyboards and mice, additional storage, and other peripherals.

The hybrid tablet model enables a user to realize many of the advantages of both a tablet and a laptop, by providing a form factor that combines the two. Specifically, a hybrid tablet may include a first member and a second member mechanically and electrically interconnected to one another in a first mode, and mechanically and/or electrically disconnected from one another in a second mode. In one example, the first member may comprise a tablet member, and the second member may comprise a base member. A hybrid tablet may have a base member with a tablet member mechanically locked thereto. While the tablet member is mechanically locked to the base member, a user may interact with the hybrid as a traditional laptop. The user may then perform an explicit undocking action, such as clicking on an icon, pressing a button, or performing an explicit gesture that instructs the tablet to undock. The tablet member is then mechanically unlocked from the base member, and the user is able to operate the tablet member as a standalone tablet.

BRIEF DESCRIPTION OF THE DRAWINGS

The present disclosure is best understood from the following detailed description when read with the accompanying figures. Various features may be shown to a certain scale by way of non-limiting example, where physical scale is appropriate and logical. However, in other embodiments, dimensions of the various features may be arbitrarily increased or decreased as necessary.

DETAILED DESCRIPTION OF THE EMBODIMENTS

Overview

Figure 1:
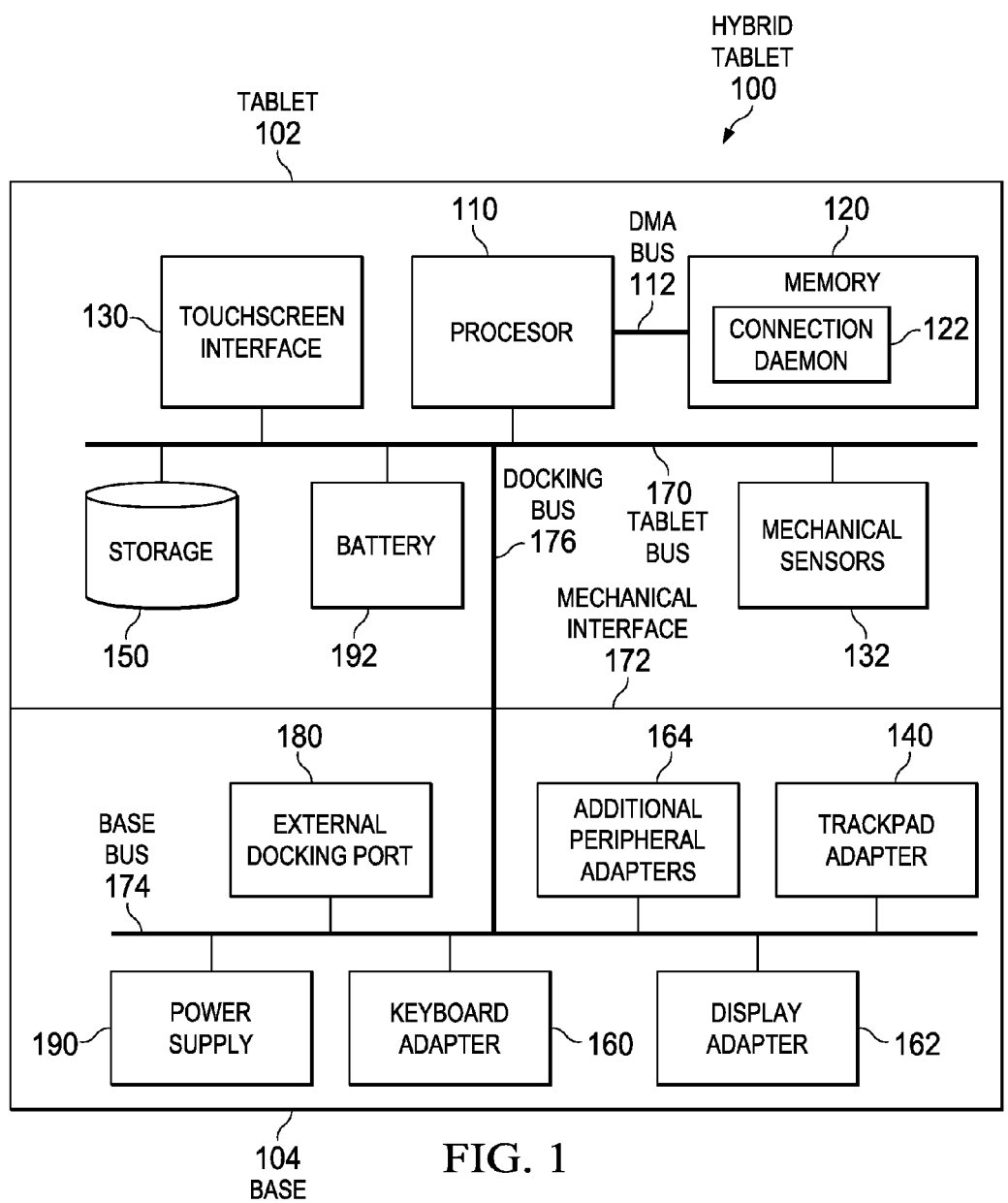
FIG. 1 is a block diagram of a hybrid tablet according to one or more examples of the present specification.

In an example, there is disclosed a hybrid tablet computing device comprising a tablet member configured to dock to a base member. The base member may include peripherals and other elements to augment the functionality of the tablet member. While docked, the base and tablet may operate in a cooperative mode, while undocking the tablet from the base places the tablet in an independent mode. A user's intent to undock may be inferred by natural interactions, including for example a user gripping the tablet along its top edge while simultaneously placing a hand over a trackpad on the base. If an undocking intent is inferred but the user does not complete the docking process within a timeout period, the tablet may redock and enter the cooperative mode.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

It is recognized in this Specification that there are limitations to some existing solutions for undocking a tablet member from a base member in a hybrid tablet computing device. As used throughout this specification, a hybrid tablet computing device includes any tablet-like computing device configured to mechanically and communicatively couple to a base member configured to extend or augment the capabilities of the tablet-like device. In certain embodiments, a hybrid tablet of the present specification may be provided as a laptop computer with a detachable screen that is configured to operate independently as a tablet when detached.

Thus, in a first mode, which may be referred to as an "independent" mode by way of example, a tablet is operable to function as a stand-alone tablet device and may provide internal to itself all or substantially all of the functions necessary to provide its intended function. In a second mode, called a "cooperative" mode by way of example, the tablet may be configured to operate cooperatively with the base. In this mode, the base may be said to extend, supplement, or otherwise augment the functionality of the tablet. For example, the base may provide additional electrical power, additional storage, additional computing power, and additional peripherals, including human interfaces and interconnect buses for external devices. In an example configuration, in the first mode, the tablet is communicatively and mechanically coupled to the base. In the second mode, the tablet is at least mechanically decoupled from the base. In certain embodiments, the tablet may maintain a communicative coupling to the base, for example via a wireless communication bus such as WiFi or Bluetooth. In some embodiments, the tablet may be completely mechanically and communicatively decoupled from the base. Thus, in certain embodiments, "decoupling" may include mechanical, electrical, and/or communicative decoupling, and may or may not include the act of a user physically detaching the tablet from the base. This decoupling process is referred to herein generically as "undocking" the tablet from the base, and it is recognized that there are numerous species of undocking possible.

It is recognized in this Specification that there is a need for more intuitive undocking methods. For example, in certain known systems, undocking requires the use of an express "undock" button, interaction with an express undocking program (for example, by clicking on an "undock" icon), or the user performing an explicit "undock" gesture. But it is desirable to make the undocking process more intuitive and natural. For example, the present Specification anticipates certain inferential undocking procedures, wherein a user's intent to undock is inferred from certain non-explicit gestures or interactions comprising the user's natural interactions with the tablet and/or base, at which point the tablet may carry out an undock process and enter the independent mode. Once a user's intent to undock is inferred, the tablet's state is checked after a "timeout" period, for example approximately five seconds. If the undocking action is not completed within the timeout period (for example, if the user does not complete the physical undocking action), the tablet may be re-docked to the base and returned to cooperative mode.

FIG. 1 is a block diagram of a hybrid tablet 100-1 according to one or more examples of the present specification. In this FIGURE, and throughout this Specification, certain devices and functions are disclosed as separate logical blocks. These blocks may be primarily logical in nature, and are intended to represent particular functions rather than require that each function be carried out by a separate physical device or hardware. In certain embodiments, more than one function may be embodied in a single physical device, and in others, a function may be spread across multiple physical devices. It should also be noted that hybrid tablet 100-1 is only one of many possible embodiments of a hybrid tablet computing device as disclosed herein. In the present example, hybrid tablet 100-1 comprises a tablet member 102 and a base member 104. For ease of reference, these are referred to throughout this specification as tablet 102 and base 104. In certain embodiments, tablet 102 may be configured to operate in two separate modes.

Tablet 102 may mechanically couple to base 104 via a mechanical interface 172. Mechanical interface 172 may include, for example, any combination of one or more of pin connectors, peg connectors, magnetic coupling, spring-loaded coupling, electromagnetic coupling, hooks, tabs, or other similar device for securely mechanically joining tablet 102 to base 104. Tablet 102 may also be communicatively coupled to base 104 via a docking bus 176. Docking bus 176 may be any suitable species of bus or interconnect. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. In some examples, docking bus 176 may specifically be a physical interconnect routed through mechanical interface 172. However, this specification also anticipates embodiments where docking bus 176 may be a wireless species of interconnect, in which case undocking may not require communicatively decoupling tablet 102 from base 104.

In an example, processor 110 is communicatively coupled to a memory 120 via a direct memory access (DMA) bus 112. Memory 120 is disclosed as a single logical block in this example, and may include any suitable volatile or non-volatile memory technology, including DDR RAM, SRAM, DRAM, flash, ROM, optical media, virtual memory regions, magnetic or tape memory, or similar. In certain embodiments, memory 120 may be a relatively low-latency volatile main memory, while storage 150 may be a relatively higher-latency non-volatile memory. Memory 120 and storage 150 need not be physically separate devices, however, and in some examples may represent simply a logical separation of function. It should also be noted that although DMA is disclosed by way of non-limiting example, DMA is not the only protocol consistent with this specification, and that other memory architectures are available. Thus, DMA bus 112 is provided by way of example only. Processor 110 is a non-limiting example of a processor. As used throughout this specification, a "processor" includes any combination of hardware, software, or firmware providing programmable logic, including by way of non-limiting example a microprocessor, digital signal processor, field-programmable gate array, programmable logic array, application-specific integrated circuit, or virtual machine processor.

Memory 120 may have encoded therein executable instructions operable for providing a connection daemon 122. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. It should also be noted that connection daemon 122 is provided by way of non-limiting example only, and that other software, including interactive or user-mode software, may also be provided in conjunction with, in addition to, or instead of connection daemon 122 to perform methods according to this Specification.

Connection daemon 122 may be operable to continuously monitor the status of mechanical interface 172 and docking bus 176 to determine whether base 104 is connected to tablet 102. When connection daemon detects an undock event, it may send a signal or data instructing tablet 102 to move from its cooperative mode to its independent mode. This may include, for example, terminating any connection to base bus 174 or any peripherals of base 104. It may also include unloading drivers associated with base 104, powering down interconnects for base 104, releasing electromechanical locks on mechanical interface 172, and any other actions necessary to complete the docking process. When connection daemon 122 detects a dock event, it may send a signal or data instructing tablet 102 to move from its independent mode to its cooperative mode. This may include, for example, opening connections to base bus 174 and the peripherals of base 104. It may also include loading drivers associated with base 104, powering up interconnects for base 104, locking electromechanical locks on mechanical interface 172, and any other actions necessary to complete the docking process.

Processor 110 is also communicatively coupled to other system elements via tablet bus 170. Tablet bus 170 may also be any suitable species of bus, and it should be noted that although tablet bus 170 is disclosed in this example as a single bus, other or additional buses may be used in certain circumstances. Peripherals connected to processor 110 via tablet bus 170 may include, by way of nonlimiting example, a touchscreen interface 130, a storage 150, and mechanical sensors 132. A battery 192 may also provide power, and may be a rechargeable battery that is recharged when tablet 102 is connected to base 104, particularly where base 104 is connected to an external power supply. It should be noted that battery 192 may power system elements via tablet bus 170, or via a dedicated power bus.

Touchscreen interface 130 may be configured to interface with any suitable touchscreen, including a capacitive, pressure sensitive, infrared, or other similar touchscreen technology. In this example, touchscreen interface 130 is configured to drive a combined input/output device, wherein a common surface is used for displaying certain outputs to a user, and the same surface is used for receiving inputs from the user. In certain embodiments, touchscreen interface 130 may provide graphical display elements that may be driven onto a touchscreen, such as touchscreen 230 of FIG. 2, and which may provide icons or other graphics for a user to interact with. The user may interact with those graphics or icons by touching touchscreen 230 with one or more fingers, which may capacitively detect the user's interactions. Those interactions may then be provided to processor 110 as user input.

Storage 150 may be any type of suitable storage medium, and in an example is another species of memory 120. Storage 150 may include stored copies of programs such as connection daemon 122.

Additional mechanical sensors 132 may also be provided to detect certain events, including events related to a user's non-explicit gestures connected with undocking tablet 102. Additional mechanical sensors 132 may include various types of transducers and detectors, including by way of non-limiting examples, capacitive sensors, pressure sensors, touch screen capacitive sensors, infrared sensors, audio/video sensors, radar sensors, thermal sensors, accelerometers, piezoelectric sensors, temperature sensors, and flex sensors.

Base 104 may also include a number of peripherals, which communicatively couples to processor 110 via docking bus 176 by way of tablet bus 170. In this example, tablet base 104 is provided as a passive device without its own processor 110. It should be noted that this configuration is provided by way of example only, and that embodiments wherein base 104 augments certain elements of tablet 102 are also envisioned. For example, base 104 may provide additional processors 110, additional memory 120, and additional storage 150. Furthermore, base 104 may provide an additional longer-term battery 192, and additional mechanical sensors 132.

In this example, base 104 includes only elements that are not present in tablet 102. These include, by way of example, an external docking port 180, a power supply 190, a keyboard adapter 160, a display adapter 162, additional peripheral adapters 164, and a trackpad adapter 140. Each of these elements are connected, by way of example, and to a base bus 174, which communicatively couples to docking bus 176, and via docking bus 176 to processor 110 through tablet bus 170. In certain embodiments, tablet bus 170, base bus 174, and docking bus 176 may all be any suitable type of bus as described in this Specification. External docking port 180 may provide a mechanical, electrical, and communicative means for docking to yet more peripherals. For example, base 104 may be a base for a laptop computer, and may include connectors for docking to a laptop docking station, which may provide the ability to dock to additional monitors, memory devices, and other peripherals. Thus external docking port 180 may also include a species a mechanical interface 172 and docking bus 176. A power supply 190 may include additional backup battery power, and in some cases may also include an interface to an external power supply providing alternating current wall power.

A display adapter 162 may be provided to interconnect hybrid tablet 100-1 to an external display, such as through a laptop docking station. Additional peripheral adapters 164 may also be provided, and may also enable coupling to additional external peripherals, such as keyboards, mice, speakers, memory and storage devices, USB ports, and other similar technologies.

Keyboard adapter 160 may be provided specifically to communicatively couple a built-in keyboard of base 104 to tablet 102. Similarly, trackpad adapter 140 may be provided to communicatively couple a built-in trackpad, mouse, or other pointing device of base 104 to tablet 102. It should further be recognized that the foregoing elements are disclosed by way of nonlimiting example only, and that many other configurations are possible. In particular, the number of peripherals that may be added to or included with a computer, including a hybrid tablet 100-1, are nearly limitless, and it is not the intention of this specification to limit the disclosure to a specific configuration.

Figure 2:
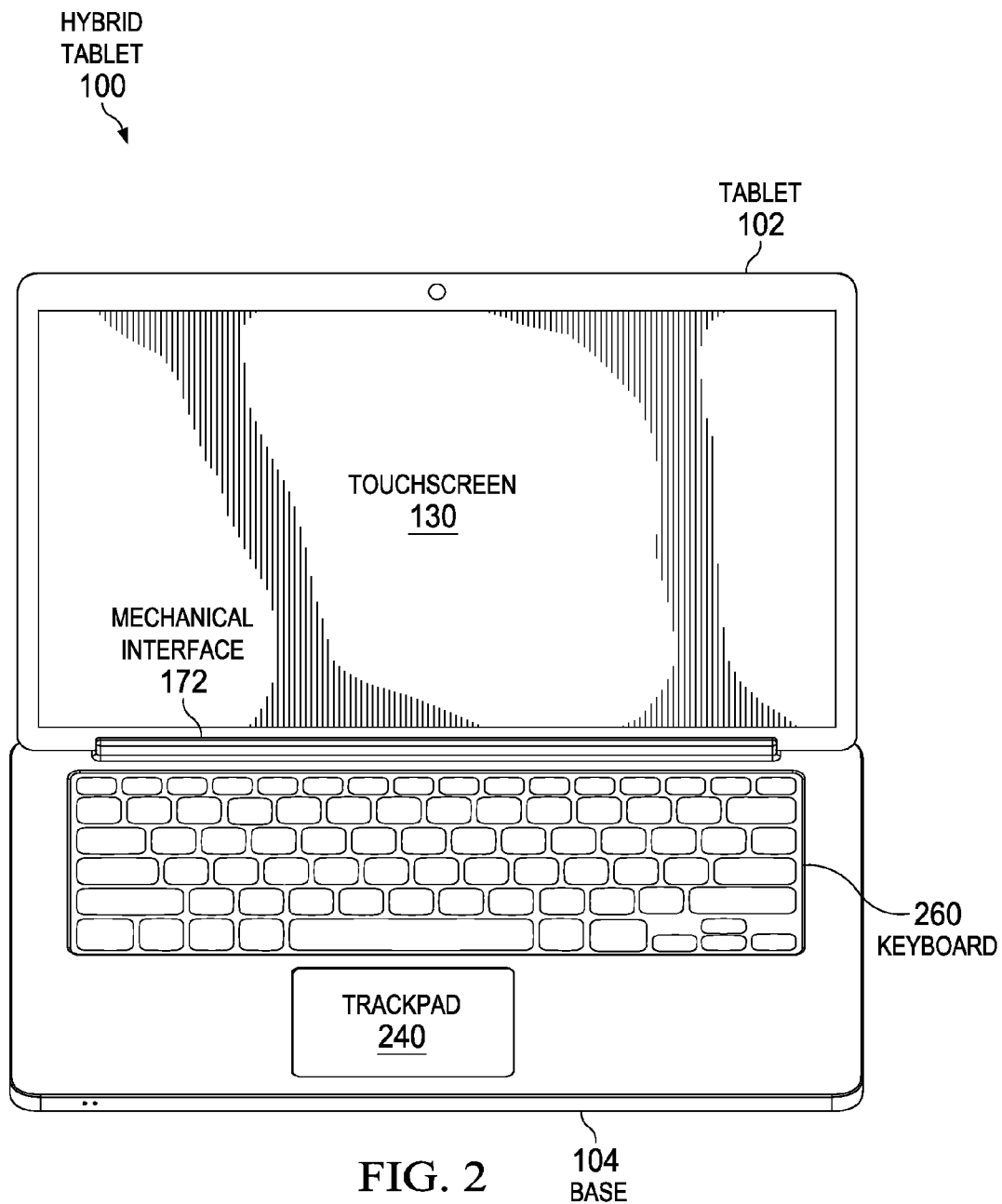
FIG. 2 is a perspective view of a hybrid tablet according to one or more examples of the present specification.

FIG. 2 is a perspective view of a hybrid tablet 100-1 according to one or more examples of the present specification. In this example, as seen in FIG. 1, hybrid tablet 100-1 includes a tablet 102 and a base 104. Tablet 102 includes a touchscreen 130 within a mechanical housing. Base 104 mechanically couples to tablet 102 via mechanical interface 172.

Base 104 also includes a keyboard 260 which may communicatively couple to keyboard adapter 160 of FIG. 1. Trackpad 240 may communicatively couple to trackpad adapter 140 of FIG. 1. Trackpad 240 may include any suitable pointing device, and in some embodiments may be representative of a sensor area of base 104 that need not necessarily be a pointing device, but that is operable to detect pressure or the presence of a hand such as hand 320 of FIG. 3.

Although a particular form factor and configuration are disclosed herein by way of example, it will be recognized that many other form factors and configurations are possible, and the embodiment disclosed in FIG. 2 is not intended to be limiting.

Figure 3:
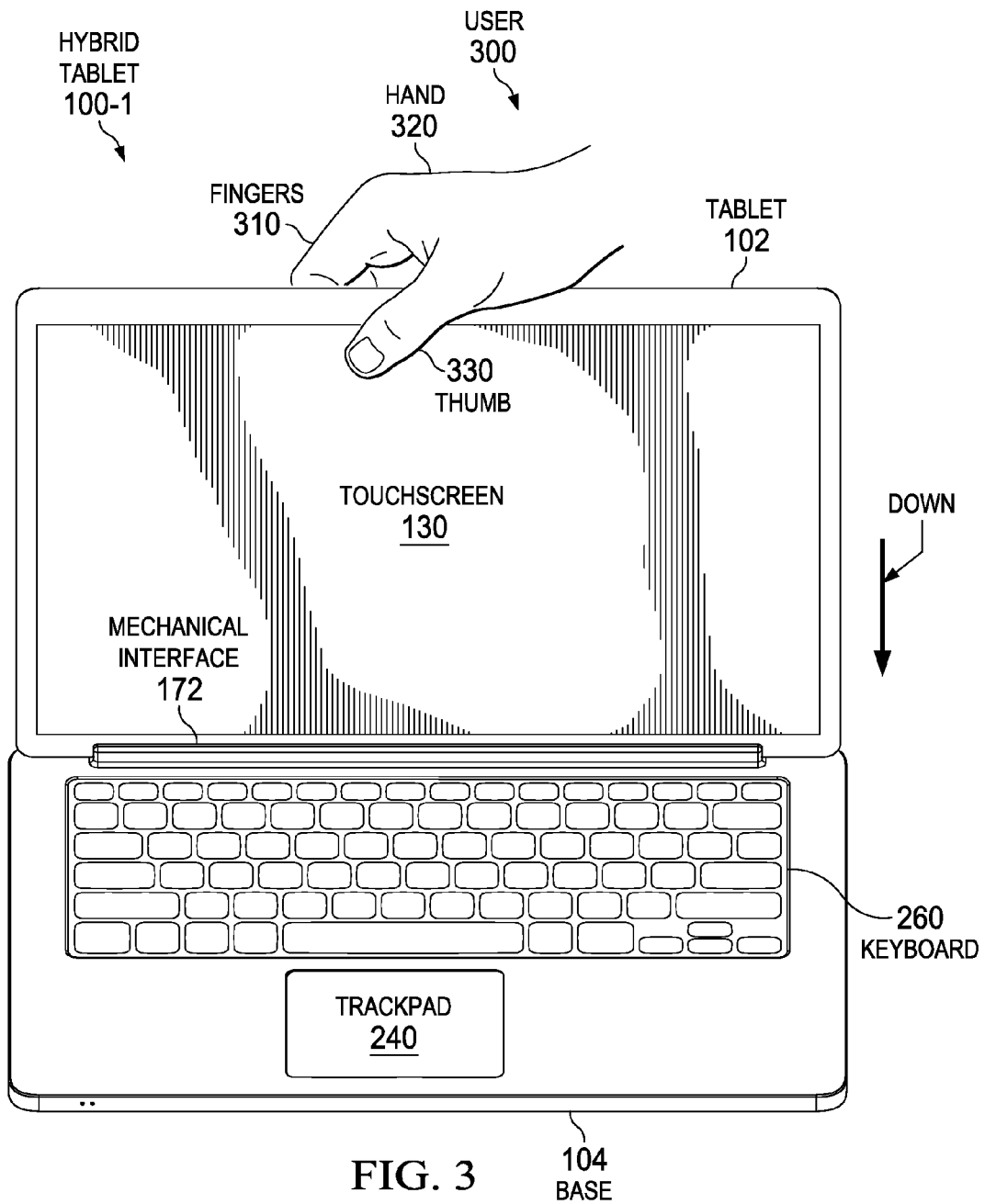
FIGS. 3 and 4 are a perspective view of a user undocking a hybrid tablet according to one or more examples of the present specification.
Figure 4:
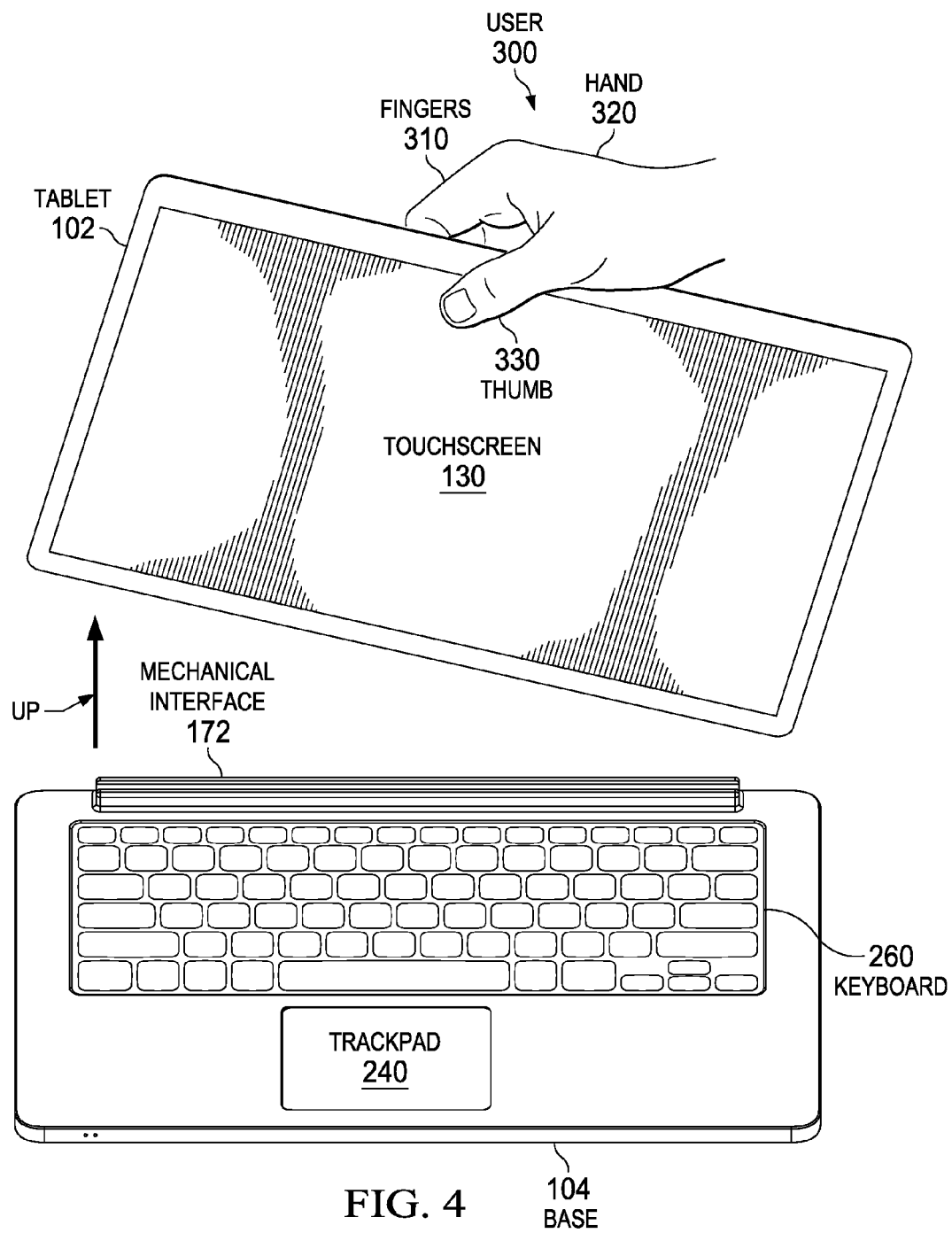

FIGS. 3 and 4 are a perspective view of a user 300 undocking a hybrid tablet 100-1 according to one or more examples of the present specification. In an example, user 300 may wish to detach tablet 102 from base 104 and to operate tablet 102 in its first (independent) mode. In certain known configurations, detaching tablet 102 from base 104 requires user 300 to perform an explicit undock action. The explicit undock action may include, for example, pressing a particular button, performing a particular explicit gesture on trackpad 240 or touchscreen 130, or otherwise taking some non-natural action to explicitly inform hybrid tablet 100-1 that user 300 wishes to detach tablet 102 from base 104.

According to certain examples of the present specification, an improved system and method are disclosed in which user 300 need not take an explicit action to inform hybrid tablet 100-1 of his intent to undock tablet 102 from base 104. In one example, user 300, uses hand 320, fingers 310, and thumb 330 to grip touchscreen 130 and press down on tablet 102. In this example, fingers 310 and thumb 330 provide opposable pressure against touchscreen 130, while hand 320 may be used to exert a gentle downward force on tablet 102. The gentle downward force of this embodiment may be a natural motion for certain users who are accustomed to releasing spring-loaded connectors. Indeed, in certain embodiments, mechanical interface 172 may include one or more spring-loaded couplings that are configured to release upon downward pressure from user 300. In certain embodiments, mechanical sensors 132 of FIG. 1 may include transducers for detecting that a spring-loaded member of mechanical interface 172 has released, and may therefore perform an appropriate sequence as disclosed in more detail with respect to FIG. 8. Thus, in one embodiment, user 300 may undock tablet 102 from base 104 simply by gripping touchscreen 130 in hand 320, exerting downward pressure, and lifting tablet 102 from base 104 as shown in FIG. 4

Figure 5:
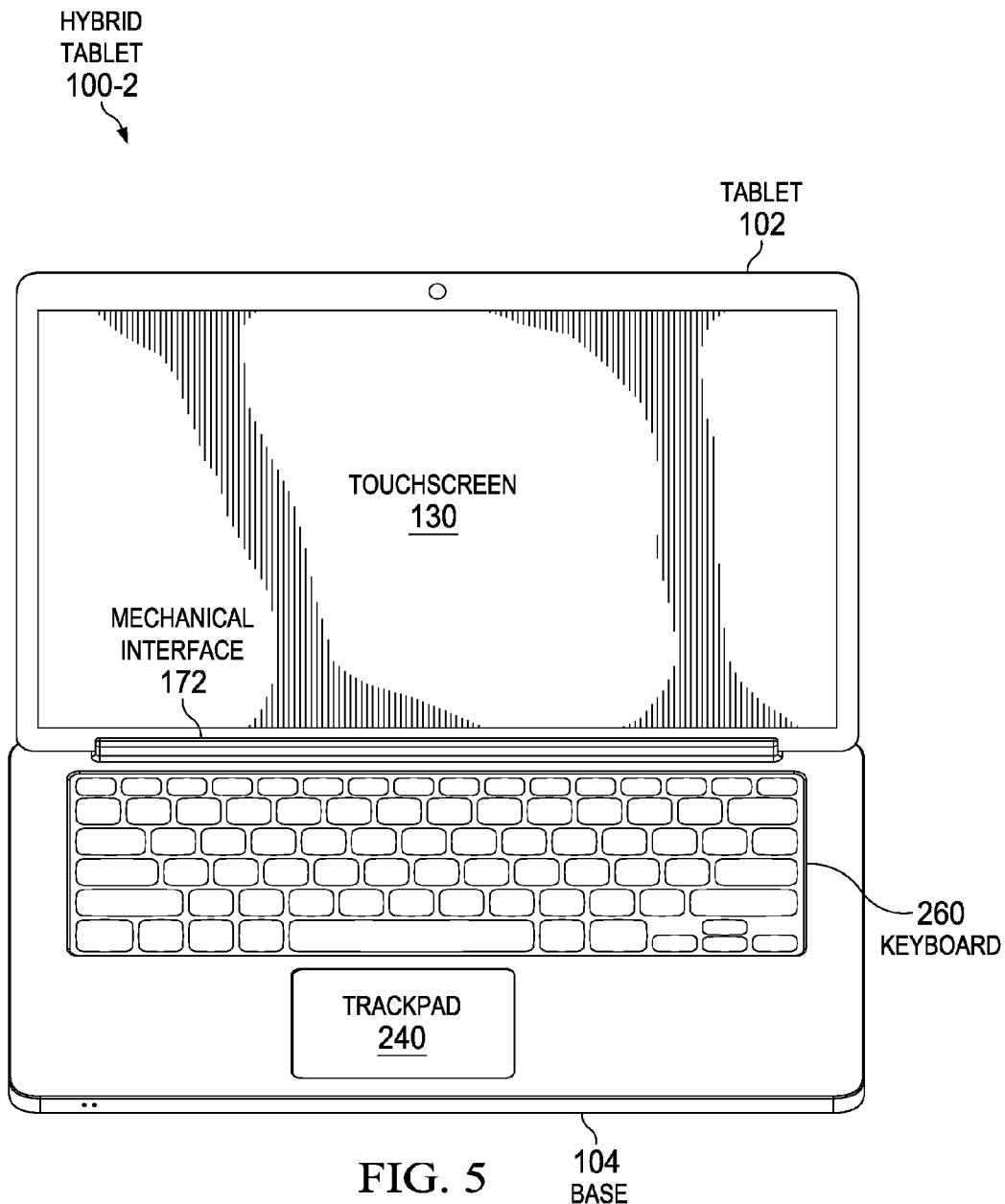
FIG. 5 is a perspective view of a second hybrid tablet according to one or more examples of the present specification.

FIG. 5 is a perspective view of a second hybrid tablet 100-2 according to one or more examples of the present specification. In some configurations, hybrid tablet 100-2 may be substantially identical to hybrid tablet 100-1 of FIG. 3 upon visual inspection. Notably, however, in some examples, hybrid tablet 100-2 may include a different mechanical interface 172 from hybrid tablet 100-1, and may include a different undocking daemon 122.

Figure 6:
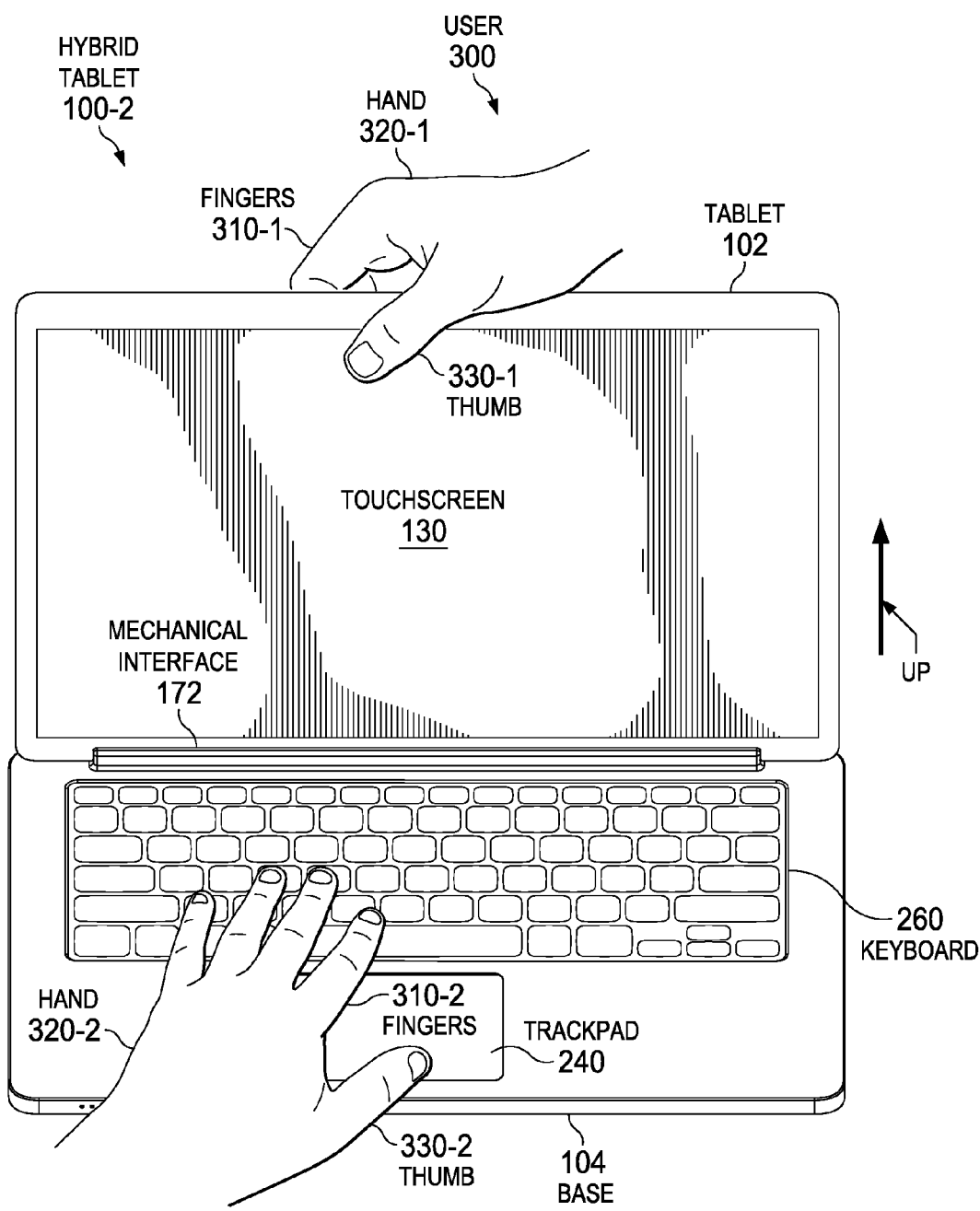
FIGS. 6 and 7 are a perspective view of a user interacting with a hybrid tablet according to one or more examples of the present specification.
Figure 7:
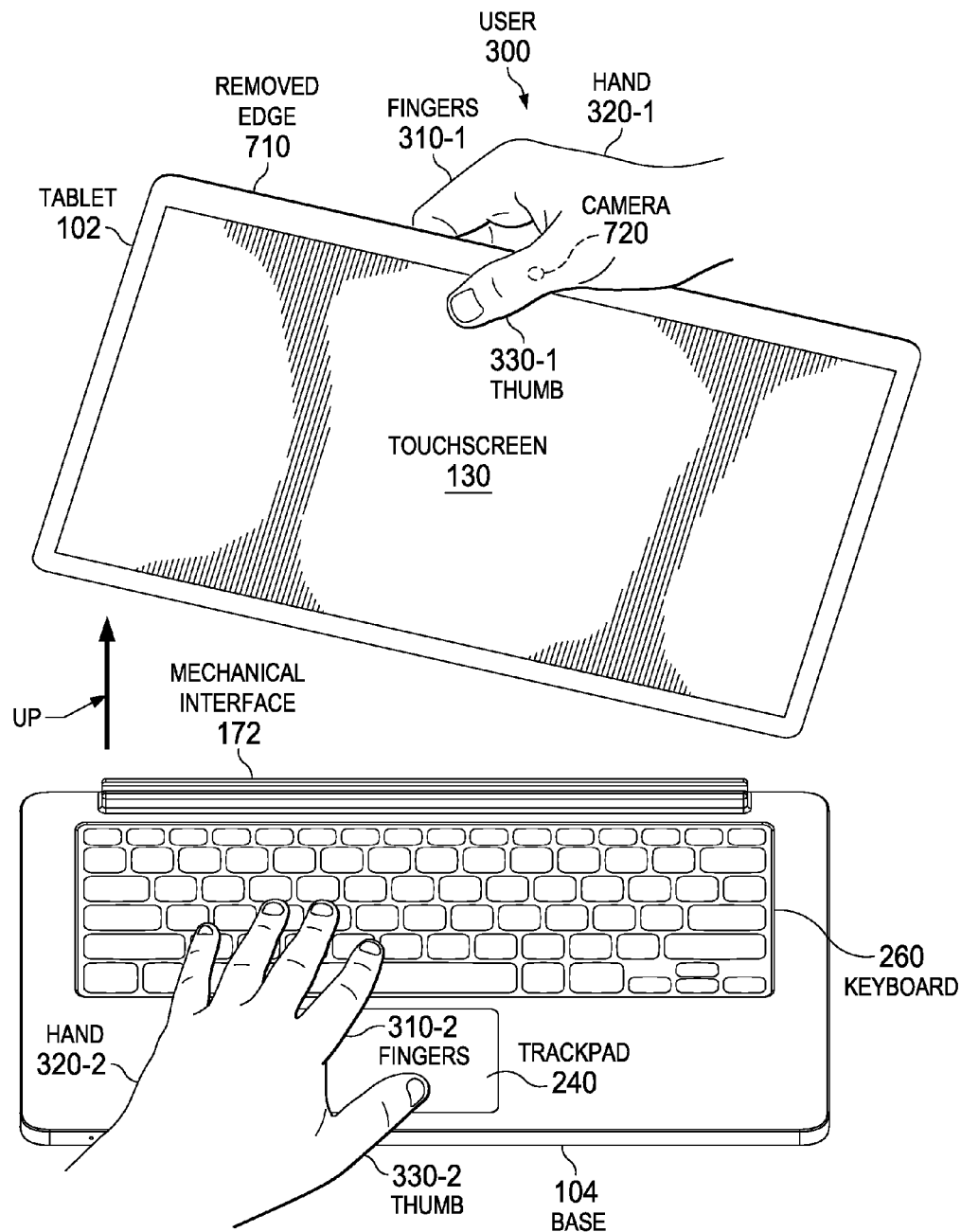

FIGS. 6 and 7 are a perspective view of a user 300 interacting with hybrid tablet 100-2 according to one or more examples of the present specification. Notably, in this example, user 300 interacts with hybrid tablet 100-2 using two hands 320. According to this embodiment, it is recognized that in some cases, for user 300 to more securely and effectively lift tablet 102 from base 104, including decoupling mechanical interface 172, upon lifting tablet 102 in an upward direction, any residual friction in mechanical interface 172 may cause base 104 to also lift upward. Thus, user 300 may naturally be inclined to use hand 320-2 to secure base 104 while lifting tablet 102 upward. Note that in certain configurations, the directions upward and downward may be defined with respect to mechanical interface 172, with upward being a direction away from mechanical interface 172, and downward being a direction toward mechanical interface 172. As seen in FIG. 7, when user 300 uses hand 320-1 to lift tablet 102 away from base 104, while simultaneously using hand 320-2 to secure base 104, the lifting action may be naturally more successful. Thus, this action may represent a natural, non-explicit action that user 300 may take to undock tablet 102 from base 104. Hybrid tablet 102 may use a variety of means to detect such an action.

In one example, mechanical pressure sensors, which may be an embodiment of mechanical sensors 132 of FIG. 1 may be provided along a removed edge 710 of tablet 102. In other examples, other sensors such as PVDF piezoelectric sensors may be used to detect a gripping action. In this example, removed edge 710 is specifically a removed edge from mechanical interface 172 when tablet 102 is docked to base 104. It should be noted, however, that removed edge 710 need not necessarily be diametrically opposite to mechanical interface 172 as shown in this example. For example, in some embodiments, removed edge 710 could instead be defined along a side of tablet 102 instead of the top. It should be recognized that many other configurations are also possible. Mechanical pressure sensors along removed edge 710 may be used to detect pressure exerted by the opposable gripping action of thumb 310-1 and fingers 330-1.

As a second parameter, one or more sensors on base 104 may be used to detect the proximity of an object, such as a hand. For example, existing capacitive or other sensors of trackpad 240 may detect the presence of hand 320-2, or a substantial portion thereof lying across trackpad 240. In particular, it may not be common in certain interactions for user 300 to lay a palm of hand 320-2 across trackpad 240. In other cases it may not be considered natural to use more than one or two fingers 310-2 to operate trackpad 240. Thus, existing capacitive sensors within trackpad 240 may detect the presence of a palm or more than two fingers 310-2 of hand 320-2 across trackpad 240. This may indicate that user 300 is performing an undock action rather than an ordinary data interaction. In some embodiments, a combination of pressure sensors along removed edge 710 and capacitive sensors on trackpad 240 may be used, wherein both inputs must be present to engage the decoupling action. This prevents, for example, a decoupling action from being initiated when user 300 casually lays hand 320-2 across trackpad 240 with no intention of undocking tablet 102.

It should also be recognized that many other combinations of sensors may be used to detect a non-explicit undocking action consistent with this Specification. For example, pressure sensors within trackpad 240 may be used to detect that additional pressure is exerted on trackpad 240 without resorting necessarily to measuring the existence of a palm or additional fingers 310-2 on trackpad 240. Similarly, touchscreen 130 need not rely on pressure sensors along removed edge 710 to detect the gripping action of hand 320-1. In one example, the gripping action is detected by the presence of a full thumb 330 or three or more fingers 310-1 across a portion of touchscreen 130. This may indicate that a user is performing a non-data action, because in many data actions, a user will use only a fingertip to interact with touchscreen 130.

In another embodiment, touchscreen 130 includes a dielectric material disposed within removed edge 710. In this case, thumb 310-1 and fingers 330-1 are conductive surfaces. When the two conductive surfaces are laid across touchscreen 130, touchscreen 130 may use additional sensors 132 to detect a change in capacitance from the gripping action.

In yet another embodiment, tablet 102 may include front and rear cameras 720. In some cases, both front and rear cameras 720 may be disposed in approximately the center of removed edge 710. Because it is natural for user 300 to grip tablet 102 at approximately the center of removed edge 710, hand 320-1 may naturally obscure cameras 720 during the gripping action. Thus, in some embodiments, while user 300 is using hand 320-1 to grip tablet 102, front and rear cameras 720 may both detect a substantial blockage of visible light input. The substantial blockage of visible light input may be used to infer the gripping action.

Figure 8:
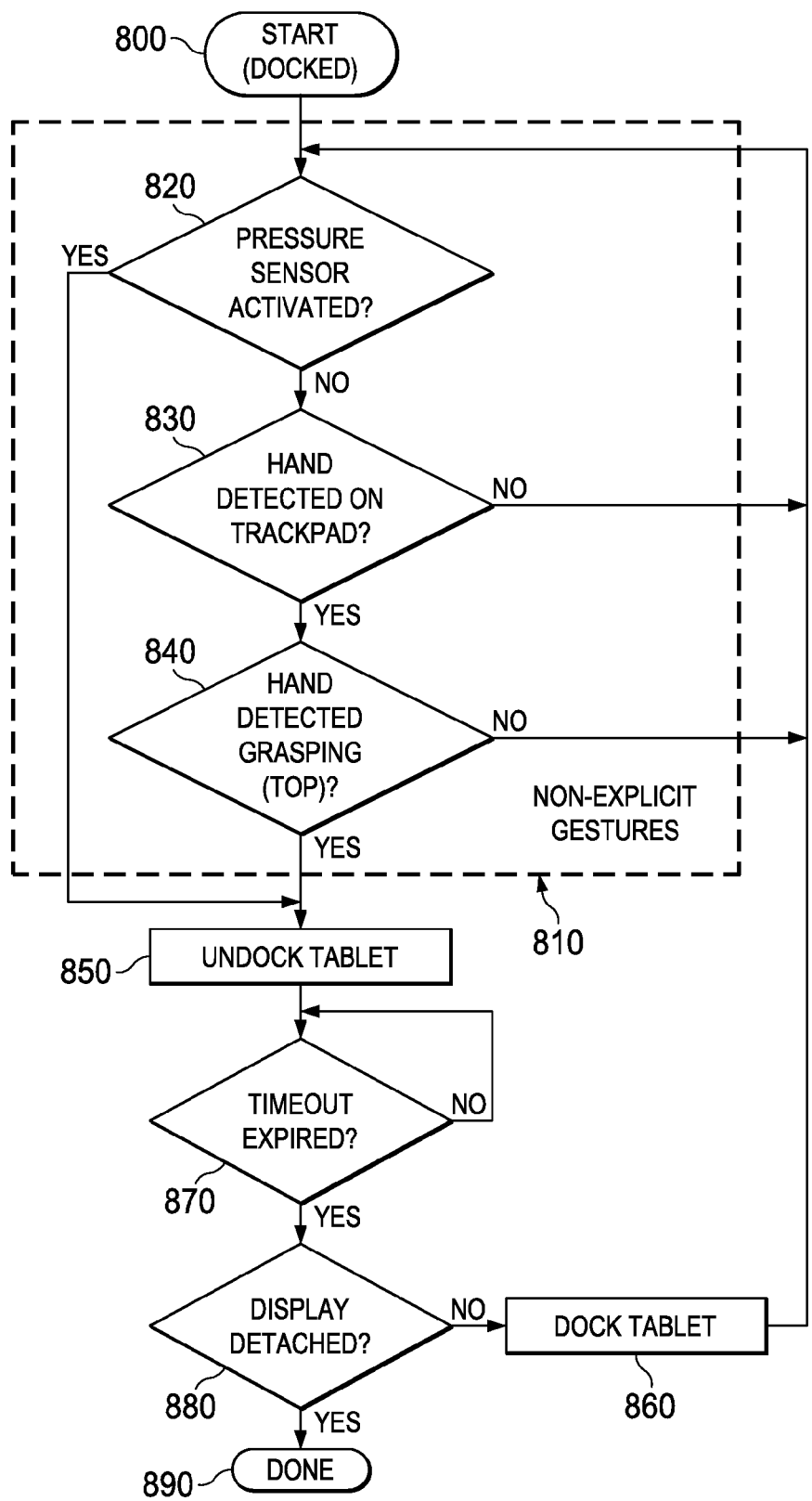
FIG. 8 is a flow diagram of an example method of undocking a tablet from a base according to one or more examples of the present specification.

FIG. 8 is a flow diagram of an example method 800 of undocking tablet 102 from base 104 according to one or more examples of the present specification.

In this method, metablock 810 can be usefully considered as a single decision block, with the condition being "has the user performed a non-explicit undock gesture"? If the answer is "yes," then control passes to block 850. If the answer is "no," then metablock 810 loops back onto itself waiting for the user to perform a non-explicit undock gesture. Thus, it is intended for meta-block 810 to include any of the non-explicit gestures disclosed in this specification, including any combination thereof or any non-explicit gesture consistent with this Specification. Thus, in one example, both a first hand 320 must be detected on trackpad 240, and a second, gripping hand 320 must be detected along the top of removed edge 710 of tablet 102. If both of these factors are not present, then the method may not proceed. Many other combinations and permutations of this method will be apparent to those studying this specification. Thus, the output of meta-block 810 may be referred to generally as satisfying the internal conditions of meta-block 810.

In one example, metablock 810 comprises three individual decision blocks, 820, 830, and 840. In block 820, tablet 102 detects whether a pressure has been applied, such as to removed edge 710. This may include any of the detection methods disclosed herein. In this example, the user gripping removed edge 710 with detectable pressure is a sufficient non-explicit gesture, and control passes to block 850. But if pressure has not been applied in block 820, then in block 830, additional sensors may be used to detect whether a hand 320 is substantially lying across trackpad 240 as disclosed in FIGS. 3 and 4. If no hand is detected on trackpad 240, then metablock 810 loops back on itself.

If a hand is detected on trackpad 240 in block 830, then in block 840, if a hand is also detected gripping a top portion of tablet 102, such as removed edge 710, then control passes to block 850. In this example, meta block 810 includes logic of the form A|(B & C), wherein "A" is detecting pressure as in FIGS. 3 and 4, while "B" and "C" represent detecting both a hand across removed edge 710 and a hand on trackpad 240, as shown in FIGS. 6 and 7. Either of these conditions is sufficient to serve as a non-explicit gesture and to initiate the undocking procedure. It should be noted, however, that these details are provided for metablock 810 by way of example only, and that many other combinations of inputs are useful for inferring a user's intent to undock a tablet according to a non-explicit undock gesture.

In block 850 hybrid tablet 100 may release mechanical interface 172, and run an undock process, such as that described for connection daemon 122 of FIG. 1. The undock process may include, for example, electrically decoupling certain power elements by powering them down, and communicatively decoupling certain interconnects such as docking bus 176.

In block 870, a decision block checks whether a timeout has expired. The timeout of block 870 may be, for example, approximately 5 seconds. This is to allow for situations where user 300 performs the non-explicit gesture of metablock 810 without actually intending to undock tablet 102 from base 104. In that case, after the timeout period, in block 880, there is a check for whether user 300 has completed the undocking process. If not, then in block 860, a docking process is run, wherein mechanical interface 172 may be relocked, and interconnects and power buses may be powered back up in base 104. On the other hand, if user 300 has completed the undock process, then control passes to block 890 where the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the buffers, graphics elements, interconnect boards, clocks, DDRs, camera sensors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Embodiment Implementations

There is disclosed in example 1, a device comprising:
an interface to mechanically lock a first housing to a second housing; and
logic, at least partly implemented in hardware, to:
 receive data representing one or more non-explicit interactive gestures;
 send a release-lock instruction to the interface; and
 cause an electronic device housed in the first housing to enter a first mode in response to the first housing being decoupled from the second housing.

There is disclosed in example 2, the device of example 1, further comprising logic to:
after a time period, determine that the first housing has not been removed from the second housing;
lock the interface; and
cause the electronic device housed in the first housing to enter a second mode.

There is disclosed in example 3, the device of example 1, further comprising one or more sensors to detect the non-explicit interactive gesture.

There is disclosed in example 4, the device of example 3, wherein the one or more sensors comprise a sensor to detect pressure on at least one edge of the first housing.

There is disclosed in example 5, the device of example 4, wherein the one or more sensors further comprise a sensor to detect an object physically near or in contact with an input device disposed on the second housing.

There is disclosed in example 6, the device of example 3, wherein the one or more sensors comprise a front camera, a rear camera, and one or more sensors to detect that the front camera and rear camera are substantially obstructed.

There is disclosed in example 7, the device of example 3, wherein the one or more sensors comprise a sensor to detect a plurality of fingers substantially in a center of at least one edge of the first housing.

There is disclosed in example 8, the device of example 3, wherein the one or more sensors comprise a sensor to detect pressure substantially at a center of at least one edge of the first housing.

There is disclosed in example 9, the device of example 3, wherein the one or more sensors comprise a sensor to detect a pressure exerted on the first housing, the pressure at least partially translating to a pressure on the interface between the first housing and the second housing.

There is disclosed in example 10, a system comprising:
a first housing;
a second housing;
an interface to mechanically lock the first housing to the second housing; and
logic, at least partly implemented in hardware, to:
receive data representing one or more non-explicit interactive gestures;
send a release-lock instruction to the interface; and
cause an electronic device housed in the first housing to enter a first mode in response to the first housing being decoupled from the second housing.

There is disclosed in example 11, the device of example 10, further comprising logic to:
after a time period, determine that the first housing has not been removed from the second housing;
lock the interface; and
cause the electronic device housed in the first housing to enter a second mode.

There is disclosed in example 12, the device of example 10, further comprising one or more sensors to detect the non-explicit interactive gesture.

There is disclosed in example 13, the device of example 12, wherein the one or more sensors comprise a sensor to detect pressure on at least one edge of the first housing.

There is disclosed in example 14, the device of example 13, wherein the one or more sensors further comprise a sensor to detect an object physically near or in contact with an input device disposed on the second housing.

There is disclosed in example 15, the device of example 12, wherein the one or more sensors comprise a front camera, a rear camera, and one or more sensors to detect that the front camera and rear camera are substantially obstructed.

There is disclosed in example 16, the device of example 12, wherein the one or more sensors comprise a sensor to detect a plurality of fingers substantially in a center of at least one edge of the first housing.

There is disclosed in example 17, the device of example 12, wherein the one or more sensors comprise a sensor to detect pressure substantially at a center of at least one edge of the first housing.

There is disclosed in example 18, the device of example 12, wherein the one or more sensors comprise a sensor to detect a pressure exerted on the first housing, the pressure at least partially translating to a pressure on the interface between the first housing and the second housing.

There is disclosed in example 19, one or more non-transitory storage mediums having encoded thereon logic operable to instruct a processor for:
receiving data representing a non-explicit interactive gesture;
responsive to receiving the data, releasing a lock on a mechanical interface coupling a first housing to a second housing; and
instructing an electronic device housed in the first housing to enter a first mode.

There is disclosed in example 20, the one or more non-transitory storage mediums of example 19, wherein the logic is further operable to instruct the processor for:
after a time period, determining that the first housing has not been removed from the second housing;
locking the interface; and
causing the electronic device housed in the first housing to enter a second mode.

There is disclosed in example 21, the one or more non-transitory storage mediums of example 19, wherein the non-explicit interactive gesture comprises grasping a top edge of the first housing.

There is disclosed in example 22, the one or more non-transitory storage mediums of example 19, wherein the non-explicit interactive gesture comprises exerting a pressure on a top edge of the first housing in a manner that at least some of the pressure is translated to the interface.

There is disclosed in example 23, the one or more non-transitory storage mediums of example 22, wherein the non-explicit interactive gesture further comprises placing an object on or near a sensor disposed on the second housing.

There is disclosed in example 24, the one or more non-transitory storage mediums of example 22, wherein the non-explicit interactive gesture comprises substantially obstructing a front camera and rear camera disposed along a common edge of the first housing.

There is disclosed in example 25, the one or more non-transitory storage mediums of example 22, wherein the non-explicit interactive gesture comprises placing a plurality of fingers substantially in the center of a top edge of the first housing.

There is disclosed in example 26, the one or more non-transitory storage mediums of example 22, wherein the non-explicit interactive gesture comprises applying pressure substantially at the center of an edge of the first housing.

What is claimed is:
1. A device comprising:
a first housing, a second housing, and an interface to mechanically lock the first housing to the second housing;
a first sensor disposed along an edge of the first housing removed from the interface, the first sensor disposed to detect a user's gripping of the removed edge;
a second sensor disposed on the second housing configured to detect contact from the user's hand on the second housing; and
logic, at least partly implemented in hardware, to:
receive data representing a user gripping the removed edge and applying pressure to the second housing;
infer an undocking intent of the user;
send a release-lock instruction to the interface; and
cause an electronic device housed in the first housing to enter a first mode in response to the first housing being decoupled from the second housing.

2. The device of claim 1, further comprising logic to:
after a time period, determine that the first housing has not been removed from the second housing;
lock the interface; and
cause the electronic device housed in the first housing to enter a second mode.

3. The device of claim 1, wherein the first sensor comprises a sensor to detect pressure on at least one edge of the first housing.

4. The device of claim 1, wherein one or more of the sensors further comprise a sensor to detect an object physically near or in contact with an input device disposed on the second housing.

5. The device of claim 1, wherein one or more of the sensors comprise a front camera, a rear camera, and one or more sensors to detect that the front camera and rear camera are substantially obstructed.

6. The device of claim 1, wherein one or more of the sensors comprise a sensor to detect a plurality of fingers substantially in a center of at least one edge of the first housing.

7. The device of claim 1, wherein one or more of the sensors comprise a sensor to detect pressure substantially at a center of at least one edge of the first housing.

8. The device of claim 1, wherein one or more of the sensors comprise a sensor to detect a pressure exerted on the first housing, the pressure at least partially translating to a pressure on the interface between the first housing and the second housing.

9. A system comprising:
a first housing;
a second housing;
an interface to mechanically lock the first housing to the second housing;
a first sensor disposed along an edge of the first housing removed from the interface, the first sensor disposed to detect a user's gripping of the removed edge; a second sensor disposed on the second housing configured to detect contact from the user's hand on the second housing; and
logic, at least partly implemented in hardware, to:
receive data representing a user gripping the removed edge and applying pressure to the second housing;
infer an undocking intent of the user;
send a release-lock instruction to the interface; and
cause an electronic device housed in the first housing to enter a first mode in response to the first housing being decoupled from the second housing.

10. The system of claim 9, further comprising logic to:
after a time period, determine that the first housing has not been removed from the second housing;
lock the interface; and
cause the electronic device housed in the first housing to enter a second mode.

11. The system of claim 9, wherein the first sensor comprises a sensor to detect pressure on at least one edge of the first housing.

12. The system of claim 9, wherein one or more of the sensors further comprise a sensor to detect an object physically near or in contact with an input device disposed on the second housing.

13. The system of claim 9, wherein one or more of the sensors comprise a front camera, a rear camera, and one or more sensors to detect that the front camera and rear camera are substantially obstructed.

14. The system of claim 9, wherein one or more of the sensors comprise a sensor to detect a plurality of fingers substantially in a center of at least one edge of the first housing.

15. The system of claim 9, wherein one or more of the sensors comprise a sensor to detect pressure substantially at a center of at least one edge of the first housing.

16. The system of claim 9, wherein one or more of the sensors comprise a sensor to detect a pressure exerted on the first housing, the pressure at least partially translating to a pressure on the interface between the first housing and the second housing.

17. One or more non-transitory storage mediums having encoded thereon logic operable to instruct a processor for:
communicatively coupling to a system having a first housing mechanically coupled to a second housing at a mechanical interface;
receiving from a sensor data representing a user gripping the first housing at a removed edge from the second housing and applying pressure to the second housing;
responsive to receiving the data, inferring an undocking intent of the user and releasing a lock on the interface; and
instructing an electronic device housed in the first housing to enter a first mode.

18. The one or more non-transitory storage mediums of claim 17, wherein the logic is further operable to instruct the processor for:
after a time period, determining that the first housing has not been removed from the second housing;
locking the interface; and
causing the electronic device housed in the first housing to enter a second mode.

19. The one or more non-transitory storage mediums of claim 17, wherein the data further represents the user grasping a top edge of the first housing.

20. The one or more non-transitory storage mediums of claim 17, wherein the data further represents the user exerting a pressure on a top edge of the first housing in a manner that at least some of the pressure is translated to the interface.

21. The one or more non-transitory storage mediums of claim 20, wherein the data further represents the user placing an object on or near a sensor disposed on the second housing.

22. The one or more non-transitory storage mediums of claim 17, wherein the data further represents the user substantially obstructing a front camera and rear camera disposed along a common edge of the first housing.

23. The one or more non-transitory storage mediums of claim 17, wherein the data further represents the user placing a plurality of fingers substantially in the center of a top edge of the first housing.

24. The one or more non-transitory storage mediums of claim 17, wherein the data further represents the user applying pressure substantially at the center of an edge of the first housing.

* * * * *

UNITED STATES PATENT AND TRADEMARK OFFICE
CERTIFICATE OF CORRECTION

PATENT NO. : 9,836,084 B2  
APPLICATION NO. : 14/229793  
DATED : December 5, 2017  
INVENTOR(S) : Han Chau et al.

Page 1 of 1

It is certified that error appears in the above-identified patent and that said Letters Patent is hereby corrected as shown below:

In the Drawings

On sheet 1 of 8, in Figure 1, reference numeral 110, Line 1, delete "PROCESOR" and insert -- PROCESSOR --, therefor.

Signed and Sealed this  
Twenty-fourth Day of April, 2018

Andrei Iancu  
*Director of the United States Patent and Trademark Office*